United States Patent
Lee et al.

(10) Patent No.: US 8,662,222 B1
(45) Date of Patent: Mar. 4, 2014

(54) MOTOR ROOM OF ELECTRIC VEHICLE

(71) Applicants: Hyundai Motor Company, Seoul (KR); Kia Motors Corporation, Seoul (KR)

(72) Inventors: Hei Chang Lee, Gyeonggi-do (KR); Won Min Kim, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/714,118

(22) Filed: Dec. 13, 2012

(30) Foreign Application Priority Data

Oct. 17, 2012 (KR) .................. 10-2012-0115633

(51) Int. Cl.
*B60K 1/00* (2006.01)

(52) U.S. Cl.
USPC .... 180/65.31; 180/68.4; 180/65.1; 180/65.22

(58) Field of Classification Search
USPC .......... 180/165, 54.1, 2.1, 65.1, 65.21, 65.22, 180/65.26, 68.4, 65.31
See application file for complete search history.

(56) References Cited

U.S. PATENT DOCUMENTS

| | | | |
|---|---|---|---|
| 7,913,791 B2 * | 3/2011 | Rose et al. ................ | 180/165 |
| 2005/0022983 A1 * | 2/2005 | Kadle et al. .............. | 165/202 |
| 2011/0180336 A1 * | 7/2011 | Kurata ..................... | 180/65.1 |
| 2011/0196556 A1 * | 8/2011 | Hennings ................. | 701/22 |
| 2012/0055724 A1 | 3/2012 | Iwasa et al. | |
| 2012/0130572 A1 * | 5/2012 | Fedewa .................... | 701/22 |

FOREIGN PATENT DOCUMENTS

| | | |
|---|---|---|
| JP | 07156826 A | 6/1995 |
| JP | 2011020623 A | 2/2011 |

\* cited by examiner

*Primary Examiner* — John Walters
*Assistant Examiner* — James Triggs
(74) *Attorney, Agent, or Firm* — Edwards Wildman Palmer LLP; Peter F. Corless

(57) ABSTRACT

Disclosed is a motor room of an electric vehicle in which parts of the electric vehicle are arranged in a configuration so as to meet characteristics of the parts. The motor room may includes: a motor serving as a driving source of the electric vehicle; a reducer for receiving a driving force of the motor, reducing the driving force of the motor, and transmitting the reduced driving force to wheels of the vehicle; an electric air conditioner compressor for compressing refrigerant of an air conditioner system of the electric vehicle; and a chiller and an accumulator which form a heat pump system of the electric vehicle, wherein the electric air conditioner compressor is disposed in front of the reducer, and the chiller and the accumulator are arranged above the motor.

10 Claims, 8 Drawing Sheets

MOTOR ROOM OF ELECTRIC VEHICLE

CROSS-REFERENCE TO RELATED APPLICATION

This application claims priority to and the benefit of Korean Patent Application No. 10-2012-0115633 filed in the Korean Intellectual Property Office on Oct. 17, 2012, the entire contents of which are incorporated herein by reference.

BACKGROUND OF THE INVENTION (a) Field of the Invention

The present invention relates to a motor room of an electric vehicle, and more particularly, to a motor room of an electric vehicle in which parts installed therein are disposed to satisfy electric, mechanical, and physical characteristics.

(b) Description of the Related Art

As generally known in the art, an electric vehicle is developed to travel by a driving power from a battery. There are several types of vehicles which utilize driving power from a battery, including pure electric vehicles which utilize only electric power from a battery, and hybrid electric vehicles which utilize driving powers from both a traditional internal combustion engine and an electric battery.

In a motor room (a front compartment) of the electric vehicle, major parts are installed, such as a motor, a reducer, an electric-driven compressor of an air conditioner, an On-Board Charger (OBC), a high voltage junction box, and a heat pump system. The motor room of an electric vehicle corresponds generally to an engine room of a vehicle having an internal combustion engine as a driving power source.

FIG. 1 is a front view illustrating the arrangement in which ins major parts of an electric vehicle are installed in a motor room of a conventional electric vehicle. FIG. 2 is a plan view illustrating the arrangement in FIG. 1.

Referring to FIG. 1, a motor 12 and a reducer 14 are arranged in parallel at a lower central area of a motor room 10. An electric air conditioner compressor 16 is disposed beside the motor 12 and a chiller 18 is disposed above the compressor 16. An electric power control unit (EPCU) 22 and an On-Board charger (OBC) 24 are sequentially disposed above the motor 12 and the reducer 14. A heat pump unit (HPU) 26 is disposed to the left of the EPCU 22 and a low voltage battery 28 is disposed to the right of the OBC 24.

Referring to FIG. 2, the OBC 24 is disposed at a central area of the motor room 10, and the low voltage battery 28 is disposed to the right of the OBC 24. A high voltage junction box 34 is disposed above the OBC 24, and an accumulator 32 is disposed in front of the low voltage battery 28.

As illustrated in FIG. 2, a pipe of a heat pump system and a cooling loop of an air conditioning system are disposed within the dotted line area dot-AB, and wirings (including electric wires branched from the high voltage junction box 34) are disposed within the dotted line area dot-C.

Since the above-mentioned parts of an electric vehicle are well known and their roles, functions and operations are also well known, their detailed descriptions will be omitted for the brief and clear illustration above.

However, when the major parts of an existing electric vehicle are arranged as illustrated in FIGS. 1 and 2, several problems may arise.

When the electric air conditioner compressor 16 is disposed beside the motor 12, it becomes difficult to secure control performance of the motor 12 by varying a gap of a resolver (not shown) which serves as a sensor. Moreover, it is difficult to reduce noise vibration harshness (NVH) due to high frequency noise generated by the motor 12 and the electric air conditioner compressor 16, and interference and superposition of the noise.

Further, when a heat pump system is provided in the electric vehicle, the electric air conditioner compressor 16 is disposed beside the motor 12 and the reducer 15 in parallel. This results in overlapping along the paths of the air conditioning pipes of the heat pump system and hoses of electric devices (which are provided for utilizing waste heat) This deteriorates the efficiency in the system, and degrades the aesthetic appearance of the motor room 10.

Still further, in a case when the OBC 24 is disposed at the left hand side of a driver and the high voltage junction box 34 is disposed at the right hand side of the driver, it is difficult to distribute right and left shaft loads of the front wheels. Further, it becomes difficult to provide an aesthetic appearance of the motor room 10 due to the increased length of the wirings connected to the high voltage junction box 34.

The above information disclosed in this background section is only for enhancement of understanding of the background of the invention and therefore it may contain information that does not form the prior art that is already known in this country to a person of ordinary skill in the art.

SUMMARY OF THE INVENTION

The present invention provides a motor room of an electric vehicle that optimizes noise vibration harshness (NVH) (by reducing the NVH to a suitable level) of an electric air conditioner compressor by providing an effective arrangement of major parts of the electric vehicle, secures proper load distribution of front wheels and thereby restricts torque steering, provides an arrangement of an accumulator and a chiller forming a heat pump system that both optimizes the heat pump system and provides an aesthetic appearance of a motor room, and provides a short wiring path between the motor and a high voltage junction box.

In one aspect, the present invention provides a motor room of an electric vehicle including: a motor serving as a driving source of the electric vehicle; a reducer configured for receiving a driving force of the motor, reducing the driving force of the motor, and transmitting the reduced driving force to wheels of the electric vehicle; an electric air conditioner compressor configured for compressing refrigerant of an air conditioner system of the electric vehicle; and a chiller and an accumulator configured for forming a heat pump system of the electric vehicle, wherein the electric air conditioner compressor is disposed in front of the reducer, and the chiller and the accumulator are arranged above the motor.

According to an embodiment of the present invention, pipes of the heat pump system are configured and arranged such that the pipes are close to the motor, thereby reducing loss of heat generated from the motor and allowing for collection of the heat.

According to various embodiments, an On-Board charger configured and arranged for charging a commercial alternative current power inputted to the electric vehicle. The On-Board charger may be disposed near and above the motor.

According to various embodiments, the high voltage junction box of the electric vehicle is disposed above the reducer.

According to various embodiments, the motor room further includes an area in which pipes of the heat pump system are relatively compactly arranged, an area in which pipes forming a cooling loop of the electric vehicle in association with the electric air conditioner compressor are relatively compactly arranged, and an area in which electric wires connected to the high voltage junction box are relatively compactly arranged. One or more of these areas may be independently provided.

According to various embodiments, the electric vehicle is a left-hand drive vehicle (i.e. the driver is seated at the left-hand side of the vehicle), and the area in which the pipes of the heat pump system are relatively compactly arranged is provided at a right side of the motor room.

According to various embodiments, the area in which the pipes forming the cooling loop are relatively compactly arranged is provided in a front side of the motor room.

According to various embodiments in which the electric vehicle is a left-hand drive vehicle, the area in which the electric wires connected to the high voltage junction box are relatively compactly arranged is provided at a left rear side of the motor room.

According to embodiments of the present invention, the following effects can be achieved.

By mounting the electric air conditioner compressor at a side of the reducer as far as possible from the motor which generates high frequencies, superposition of high frequencies between the motor and the electric air conditioner compressor can be prevented.

By arranging the paths of pipes forming a cooling loop and warming pipes of the heat pump system so that they are separated from each other, the motor room is provided with an aesthetic appearance.

Further, by setting the paths of the pipes forming a cooling loop and the warming pipes of the heat pump system in the shortest distance, manufacturing costs of the parts are reduced and efficiency of the air conditioning system is improved.

Further, by disposing the OBC (which is heavier than the high voltage junction box) at a right side of the motor room (when the vehicle is a left-hand drive vehicle), load distribution can be optimized during vehicle travel and torque steering can be prevented.

Further, by compactly arranging electric wiring connecting the high voltage junction box to the battery within a predetermined area, the motor room is provided with an aesthetic appearance and salability of the electric vehicle is improved.

DETAILED DESCRIPTION OF THE EMBODIMENTS

Figure 1:
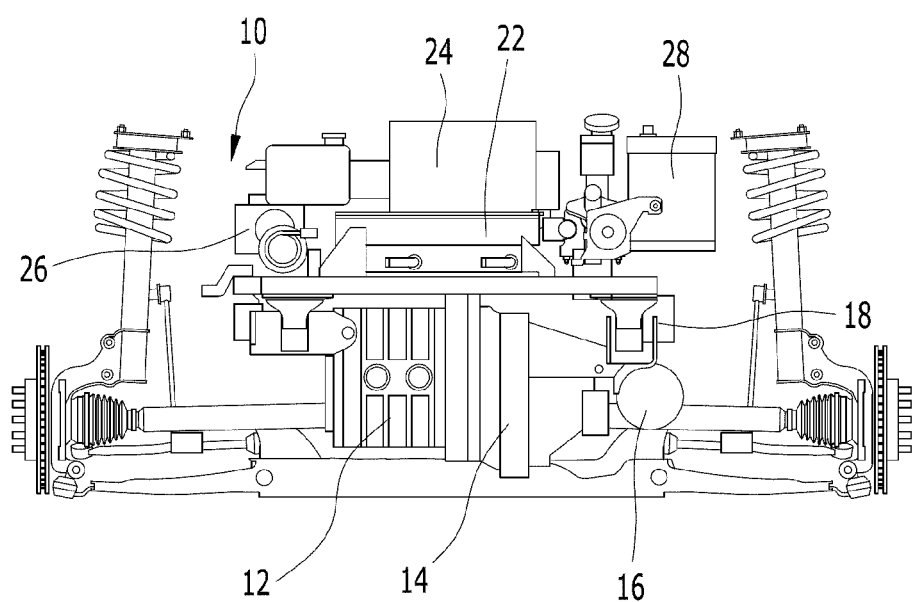
FIG. 1 is a front view illustrating the arrangement in which major parts of an electric vehicle are installed in a motor room of a conventional electric vehicle.
Figure 2:
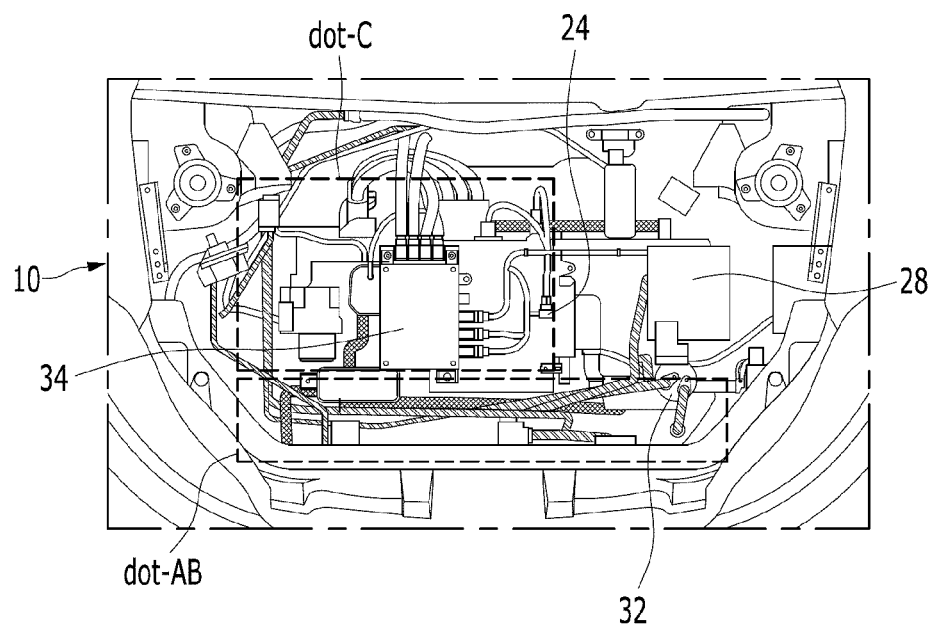
FIG. 2 is a plan view of FIG. 1.

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

According to embodiments of the present invention, the arrangement of various components are described with respect to the "front", "rear", "left" and "right" of a motor room. These positions correspond with the "front". "rear", "left" and "right" sides of the vehicle in which the motor room is provided.

According to the embodiments described herein, the electric vehicle is a left-hand drive vehicle. However, it is understood that the present invention would similarly apply to a right-hand drive vehicle. In particular, it is understood that when a component is described herein as being disposed on a left or right hand side of a left-hand drive vehicle, this configuration would be switched for application to a right-hand drive vehicle.

Further, in the embodiments of the present invention described herein, a motor room in which parts of an electric vehicle are arranged in an optimized fashion is provided. These arranged parts can be installed by a person having ordinary skill in the art using well-known techniques, and, thus, a detailed description for the assembly and installation of the parts will be omitted.

The present invention relates to vehicles which utilize electric power of a battery, particularly to electric vehicles which are powered purely through electric power of a battery (a "pure electric vehicle"), and hybrid electric vehicles which using both a driving power of a traditional internal combustion engine and electric power of a battery.

Figure 3:
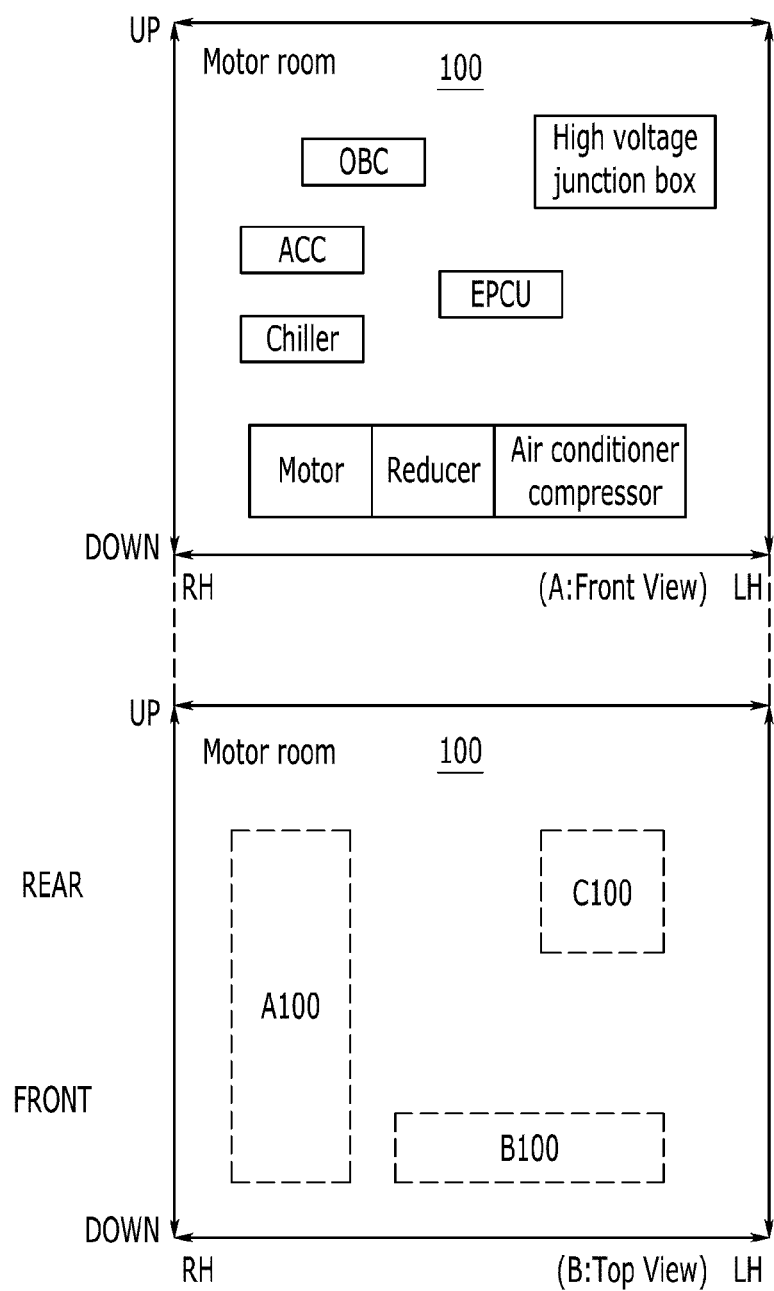
FIG. 3 is a diagram illustrating a motor room according to an embodiment of the present invention, in which major parts of an electric vehicle are arranged to meet characteristics of the parts.
Figure 4:
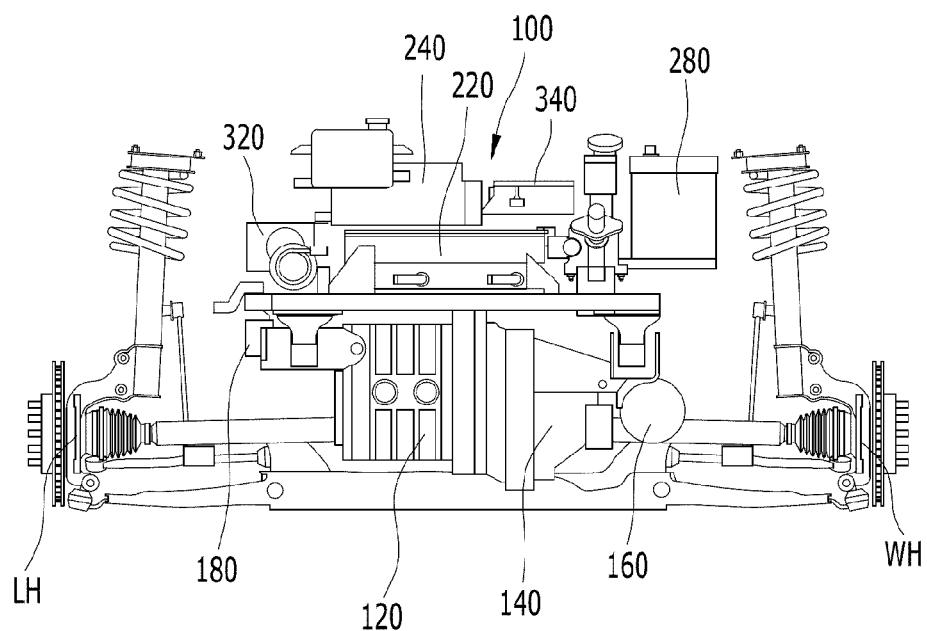
FIG. 4 is front view of the motor room of FIG. 3.
Figure 5:
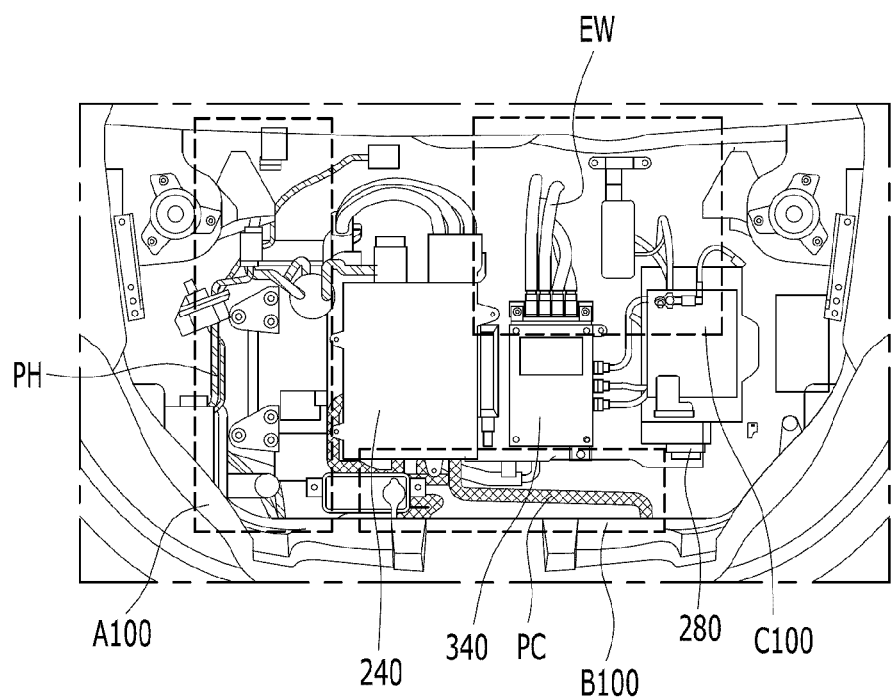
FIG. 5 is a plan view of the motor room of FIGS. 3 and 4.

As illustrated in FIGS. 3 to 5, an electric vehicle according to an exemplary embodiment of the present invention includes a motor 120 which serves as a driving source of the electric vehicle; a reducer 140 which receives a driving power of the motor 120 and reduces the driving power of the motor 120 through reducer gears (not shown) to transmit the driving power to wheels through differential gears and a driving shaft; and various parts of the electric vehicle including an electric air conditioner compressor 160, a chiller 180, and an accumulator 320 which form an air conditioning system and/or a heat pump system of the electric vehicle. As referred to herein, the motor room 100 corresponds generally to an engine room of a conventional vehicle having an internal combustion engine.

Referring to FIGS. 3 to 5, according to an exemplary embodiment, the air conditioner compressor 160 is disposed beside the reducer 140.

As illustrated in FIGS. 3 to 6, the chiller 180 and the accumulator 320, which are included in an air conditioning system and/or a heat pump system of an electric vehicle, are disposed above the motor 120.

Figure 6:
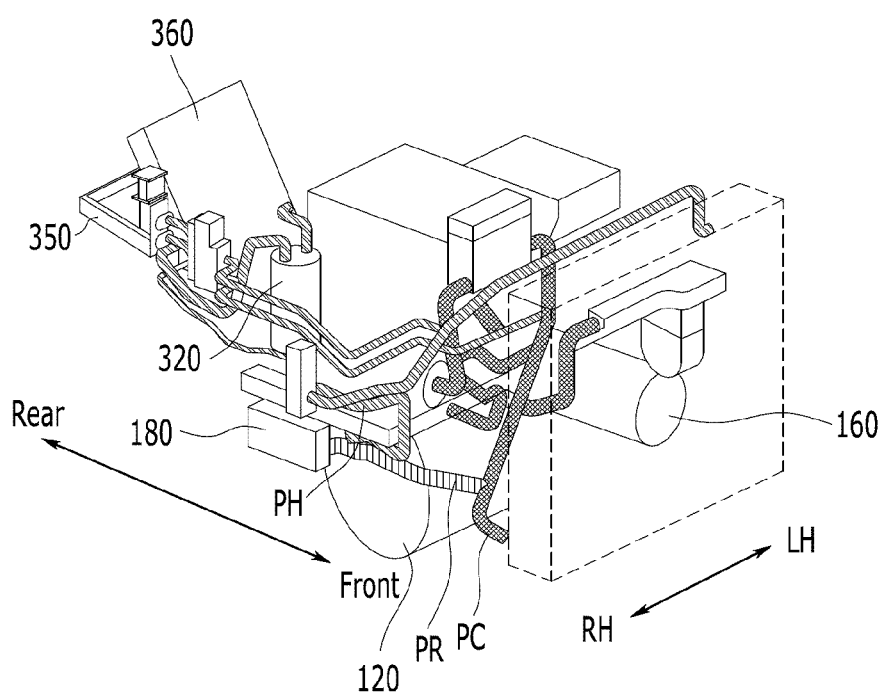
FIG. 6 is a perspective view illustrating an embodiment of the present invention in which a chiller, an accumulator, an evaporator and pipes thereof, are arranged to meet characteristics of the parts.

According to an embodiment of the present invention, as shown in FIGS. 5 and 6, a pipe PH of the heat pump system is disposed toward the motor 120.

Further, as shown in FIG. 3, an On-Board charger (OBC) 240, which is configured for charging a battery of the electric vehicle with a commercial alternative current power to be inputted to the electric vehicle, may be disposed above the motor 120.

As shown in FIG. 4, a high voltage junction box 340 may be disposed above the reducer 140.

According to embodiments of the present invention, one or more areas are provided in which various pipes and wires may be compactly arranged. In particular, according to an exemplary embodiment of the present invention, an area A100 is provided in which the pipes PH (shaded pipes in the drawings) of the heat pump system are relatively compactly arranged. A further area B100 is provided in which pipes PC (pipes indicted by checked pattern in the drawings) forming a cooling loop of an electric vehicle are relatively compactly arranged in association with the electric air conditioner compressor 160. An area C100 is further provided in which electric wires EW connected to the high voltage junction box 340 are relatively compactly arranged. Relatively compactly arranged generally means that the pipes and wires are arranged in a compact manner relative to a conventional configuration.

Referring to FIGS. 3 to 5, the area A100 in which the pipes PH of the heat hump system are relatively compactly arranged may be provided at a right side of the motor room 100 in a left-hand drive (LHD) vehicle. In contrast, in a right-hand drive (RHD) vehicle, the area A100 would be provided at a left side of the motor room 100.

As further shown, the area B100 in which the pipes PC forming the cooling loop are relatively compactly arranged may be provided in a front area of the motor room 100.

Further, the area C100 in which the electric wires EW connected to the high voltage junction box 340 are relatively compactly arranged may be provided at a left rear side of the motor room 100 in a left-hand drive (LHD) vehicle. In contrast, in a right-hand drive (RHD) vehicle, the area C100 would be provided at a right rear side of the motor room 100.

As shown in FIG. 3 to FIG. 8, an electric power control unit (EPCU) 220 is configured and arranged for controlling an electric power of the electric vehicle, and a low voltage battery 280 is configured and arranged to provide a low voltage required by the electric vehicle. An inner condenser 350 and an evaporator 360 are may further be provided for the heat pump system.

Since the functions, operations and/roles of the EPCU 220, the low voltage battery 280, the inner condenser 350 and other parts of the present invention are widely known, the detailed descriptions thereof will be omitted herein.

Operations of the motor room of an electric vehicle according to an exemplary embodiment of the present invention will now be described with reference to FIGS. 3 to 8.

In this exemplary embodiment of the present invention, the electric air conditioner compressor 160 is arranged at a side of the reducer 140 as illustrated in FIGS. 3 and 4 to reduce NVH which increases due to the superposition of high frequencies and vibrations generated from the motor 120. That is, according to the exemplary embodiment of the present invention, since the motor 120 which generates high frequencies is disposed a large distance (preferably as far as possible) from the electric air conditioner compressor 160, the NVH of the electric air conditioner compressor 160 is optimized (i.e. reduced).

The chiller 180 and the accumulator 320 of the air conditioning system and/or the heat pump system of the electric vehicle, as illustrated in FIGS. 3, 4, 6, and 8, are arranged above the motor 120 so that heat generated from the motor 120 and other electric parts can be effectively collected to increase efficiency of the heat pump system. In particular, as illustrated in FIGS. 5 and 6, when the chiller 180 and the accumulator 320 are disposed on a right hand (RH) side, the pipes PH forming the heat pump system are relatively compactly arranged in the RH side in an area are A100 of the motor room 100. This configuration improves efficiency of the heat pump system and enhances the aesthetic appearance of the motor room 100.

As further shows, the chiller 180 and the accumulator 320 are disposed above the motor 120, and the electric air conditioner compressor 160 is disposed at the side of the reducer 140. As such, the pipes PC forming the cooling loop in association with the compressor 160, as illustrated in FIG. 5, may be provided in a front area B100 of the motor room 100. This configuration maximizes the cooling and warming efficiencies.

Figure 7:
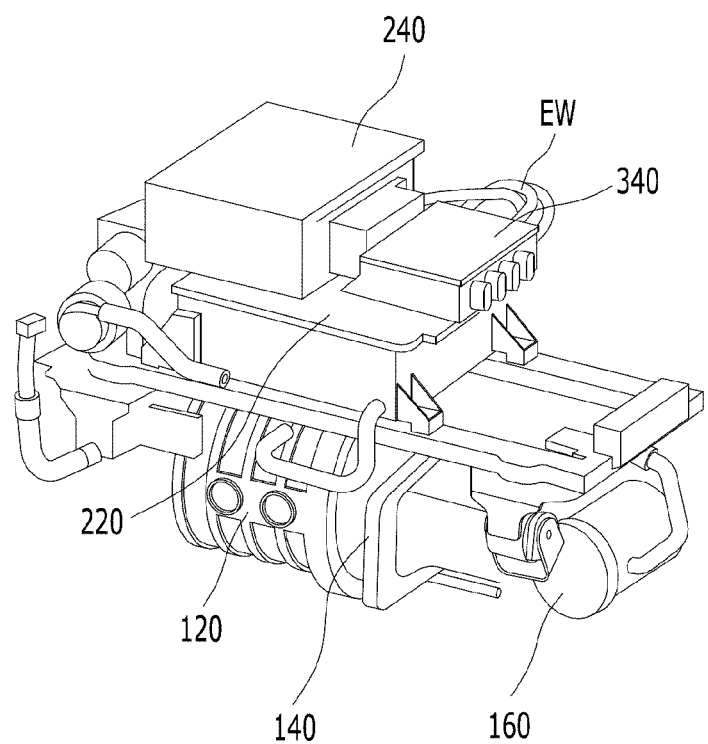
FIGS. 7 and 8 are perspective views illustrating an embodiment of the present invention in which an electric air conditioner compressor, a high voltage junction box, and a slow charger are arranged in the motor room.
Figure 8:
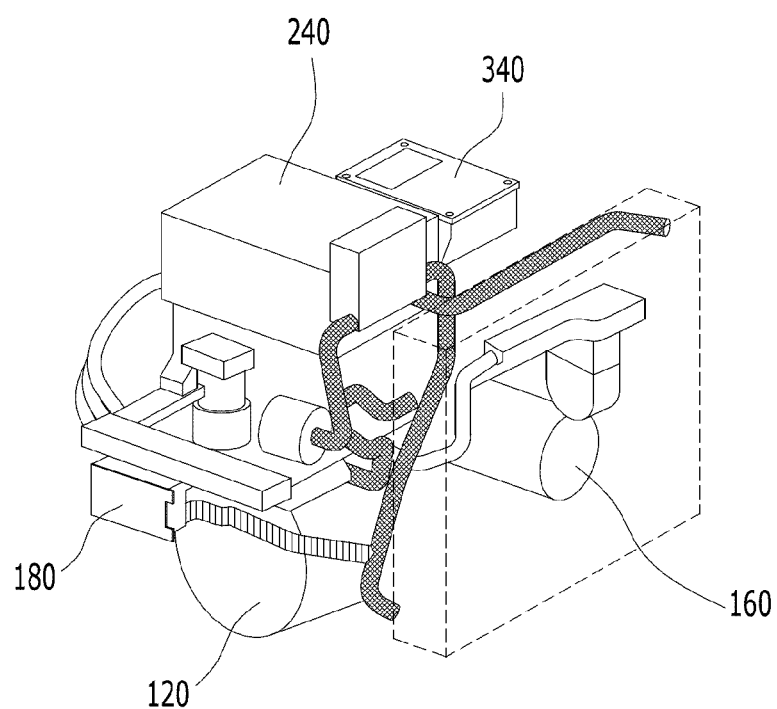

According to this exemplary embodiment of the present invention, the On-Board charger (OBC) 240, as illustrated in FIGS. 3, 4, and 7, is disposed above the motor 120, while the high voltage junction box 340 is disposed above the motor 120 in parallel to the OBC 240. As a result, the shaft load of a front wheel drive vehicle can be effectively distributed and the length of the electric wires EW connected to the high voltage junction box 340 can be shortened. In particular, the weight of the OBC 240 disposed above the motor 120 effectively distributes the shaft load of the front wheel drive vehicle. Further, in a case where the high voltage junction box 340 is disposed above the reducer 140 in parallel to the OBC 240, since the electric wires EW installed in the motor room 100 (as illustrated in FIG. 5) can be relatively compactly arranged in area C100, costs can be reduced due to the shortened length of the electric wires and the aesthetic appearance of the motor room 100 can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: | motor room |
| 120: | motor |
| 140: | reducer |
| 160: | electric air conditioner compressor |
| 180: | chiller |
| 240: | On-Board charger |
| 320: | accumulator |
| 340: | high voltage junction box |

What is claimed is:

1. A motor room of an electric vehicle comprising:
 a motor configured for serving as a driving source of the electric vehicle;
 a reducer configured for receiving a driving force of the motor, reducing the driving force of the motor, and transmitting the reduced driving force to wheels of the vehicle;
 an electric air conditioner compressor configured for compressing refrigerant of an air conditioner system of the electric vehicle; and
 a chiller and an accumulator forming a heat pump system of the electric vehicle,
 wherein the electric air conditioner compressor is disposed in front of the reducer,
 the chiller and the accumulator are arranged above the motor, and
 one or more pipes for the heat pump system, the one or more pipes being arranged in a path close to the motor to thereby reduce loss of heat generated from the motor and to collect heat generated from the motor.

2. The motor room of claim 1, wherein an On-Board charger for charging a commercial alternative current power inputted to the electric vehicle is disposed near and above the motor.

3. The motor room of claim 1, wherein the high voltage junction box of the electric vehicle is disposed above the reducer.

4. The motor room of claim 1, further comprising:
 a first area in which one or more pipes of the heat pump system are arranged, a second area in which one or more pipes forming a cooling loop of the electric vehicle in association with the electric air conditioner compressor are relatively compactly arranged, and a third area in which electric wires connected to the high voltage junction box are arranged;
 wherein the first, second and third areas are independently provided.

5. The motor room of claim 4, wherein:
 the electric vehicle is a left-hand drive vehicle, and
 the first area is provided at a right side of the motor room.

6. The motor room of claim 4, wherein the second area is provided in a front side of the motor room.

7. The motor room of claim 4, wherein the third area is provided at a left rear side of the motor room.

8. An electric vehicle comprising the motor room of claim 1 disposed therein.

9. A motor room of an electric vehicle comprising:
 a motor configured for serving as a driving source of the electric vehicle;
 a reducer configured for receiving a driving force of the motor, reducing the driving force of the motor, and transmitting the reduced driving force to wheels of the vehicle;
 an electric air conditioner compressor configured for compressing refrigerant of an air conditioner system of the electric vehicle; and
 a chiller and an accumulator forming a heat pump system of the electric vehicle,
  wherein the electric air conditioner compressor is disposed in front of the reducer, and the chiller and the accumulator are arranged above the motor, and
  wherein an On-Board charger for charging a commercial alternative current power inputted to the electric vehicle is disposed near and above the motor.

10. A motor room of an electric vehicle comprising:
 a motor configured for serving as a driving source of the electric vehicle;
 a reducer configured for receiving a driving force of the motor, reducing the driving force of the motor, and transmitting the reduced driving force to wheels of the vehicle;
 an electric air conditioner compressor configured for compressing refrigerant of an air conditioner system of the electric vehicle;
 a chiller and an accumulator forming a heat pump system of the electric vehicle,
 wherein the electric air conditioner compressor is disposed in front of the reducer, and the chiller and the accumulator are arranged above the motor,
 a first area in which one or more pipes of the heat pump system are arranged, a second area in which one or more pipes forming a cooling loop of the electric vehicle in association with the electric air conditioner compressor are arranged, and a third area in which electric wires connected to the high voltage junction box are arranged,
 wherein the first, second and third areas are independently provided, and
 wherein the electric vehicle is a left-hand drive vehicle, and the first area is provided at a right side of the motor room.

* * * * *